H. Foulkes,
Snap Hook,
Nº 57,629. Patented Aug. 28, 1866.

Witnesses
John J. Seymour
John G. Crocker

Inventor
Henry Foulkes

UNITED STATES PATENT OFFICE.

HENRY FOULKES, OF UTICA, NEW YORK, ASSIGNOR TO JOHN H. CHAPMAN.

IMPROVED BREAST-STRAP HOOK.

Specification forming part of Letters Patent No. 57,629, dated August 28, 1866.

*To all whom it may concern:*

Be it known that I, HENRY FOULKES, of Utica, Oneida county, New York, have invented a new and Improved Rein and Breast-Strap Hook; and I hereby declare that the following is a full, clear, and exact description of the construction and operation of the same, reference being had to the annexed drawings, making a part of this specification, in which—

Figure 1:
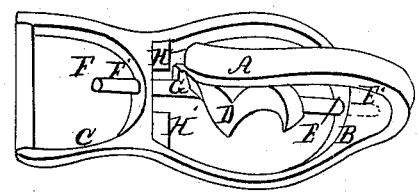
Figure 3:
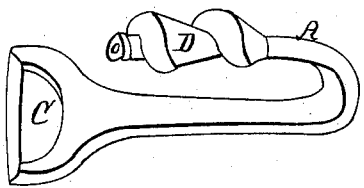
Figure 4:
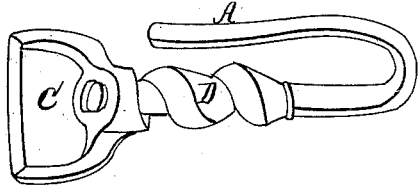
Figure 2:
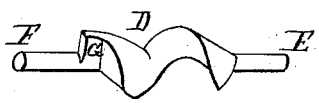

Figure 1 is a perspective view thereof, and Fig. 2 a like view of the screw; and Figs. 3 and 4 represent different forms of the invention.

A is the hook; B, the screw-holder; C, the loop to which the rein or strap is attached. D is the screw; E, the point, and F the head; and E', and F', holes or bearings for the ends of said screw; G, a stop, and H H' shoulders on the inner side of B, against which the stop G rests.

The nature of my invention consists in the application of a screw for securing or closing the hook.

All the parts may be made of suitable metal, cast or wrought. The hook A may be of any form of hook; but the shank is formed of two parts, B and C.

The part B, the one nearest A, may be of oval form, and is arranged to contain the screw D; and the part C, which is joined to the opposite end of B, forms the loop to which the rein or strap is attached.

The screw D has about one and a half turn, and the thread is deep, with the shank extending beyond the thread at both ends, E and F.

The point E is inserted in the hole E', under the hook A, and the head F passes through the hole F' in the division between B and C.

When the screw is in place it is so adjusted as to allow of being moved backward and forward a short distance in the line of its axis. At the upper end of the thread of the screw is a stop, G, and on the inner side of B and on each side of F are shoulders H H', on which the stop G will catch when the screw is drawn forward to prevent its turning. By pressing on the head of the screw F the stop G passes beyond the shoulders H H', when the screw may be turned to the right or left, as desired.

The mode of operation is as follows: If the hook is to be attached to a ring, loop, staple, or the like, throw the hook A over such ring and draw it toward you. This will press the screw in and consequently release the stop G from the shoulders H and H', when slight continued pressure on the hook will cause the screw to revolve and permit the ring to pass down along the thread of the screw to its place inside of the hook. If it is now sought to withdraw the hook from the ring, the effort will cause the screw to slide forward, and the stop G, catching on the shoulder H or H', will prevent the screw from turning, and consequently the ring cannot pass out. To enable it to do this, all that is necessary is to press gently on the head of the screw F until the stop G is beyond the shoulders H H', when, by drawing on the ring or pushing the screw back on the ring, the screw will revolve backward and the ring will pass out.

The advantages of this improvement are its cheapness, not liable to get out of repair, ease in operation, both in hooking or hitching or unhitching, and the impossibility of its failing to operate.

The above-described form is conceived to be the best for use; but the screw may be placed on the hook itself, as in Fig. 3, or on the stem of the hook, as in Fig. 4. When of the form represented in Fig. 3, the hook is detached by turning the screw by hand, and when of the form represented in Fig. 4 it is attached and detached by turning the loop C, the screw being attached to the said loop C.

What I claim as my invention, and desire to secure by Letters Patent, is—

The securing or closing the opening of the hook by the use of a screw, in the manner substantially as described.

HENRY FOULKES.

Witnesses:
JOHN F. SEYMOUR,
JOHN G. CROCKER.